(12) United States Patent
Butler

(10) Patent No.: US 9,739,026 B2
(45) Date of Patent: Aug. 22, 2017

(54) SYSTEMS AND METHODS FOR CUTTING CONCRETE PILES

(71) Applicant: J. Dustin Butler, Jackson, LA (US)

(72) Inventor: J. Dustin Butler, Jackson, LA (US)

( * ) Notice: Subject to any disclaimer, the term of this patent is extended or adjusted under 35 U.S.C. 154(b) by 78 days.

(21) Appl. No.: 15/008,906

(22) Filed: Jan. 28, 2016

(65) Prior Publication Data

US 2016/0222620 A1    Aug. 4, 2016

Related U.S. Application Data

(60) Provisional application No. 62/111,015, filed on Feb. 2, 2015.

(51) Int. Cl.

| B23D 45/10 | (2006.01) |
|---|---|
| E02D 9/00 | (2006.01) |
| B23D 45/00 | (2006.01) |
| B23D 47/10 | (2006.01) |
| B28D 1/04 | (2006.01) |

(52) U.S. Cl.
CPC ............. *E02D 9/00* (2013.01); *B23D 45/006* (2013.01); *B23D 45/105* (2013.01); *B23D 47/10* (2013.01); *B28D 1/048* (2013.01)

(58) Field of Classification Search
CPC .... B23D 45/006; B23D 45/105; B23D 47/10; B23D 1/048; E02D 9/00
USPC .......................................................... 125/14
See application file for complete search history.

(56) References Cited

U.S. PATENT DOCUMENTS

| 1,537,437 | A | * | 5/1925 | Graffinberger | B23D 47/10 |
| | | | | | 137/596 |
| 2,693,056 | A | * | 11/1954 | Gagne | B23D 45/105 |
| | | | | | 125/13.03 |
| 2,702,057 | A | * | 2/1955 | Miller | B27B 17/0091 |
| | | | | | 125/14 |
| 3,289,662 | A | * | 12/1966 | Garrison | B23D 45/024 |
| | | | | | 125/14 |
| 4,318,391 | A | | 3/1982 | Wachs | |
| 4,467,849 | A | | 8/1984 | Denis | |
| 4,832,412 | A | * | 5/1989 | Bertrand | B28D 1/045 |
| | | | | | 125/14 |
| 5,101,873 | A | * | 4/1992 | Marshall | A01G 23/091 |
| | | | | | 144/218 |
| 5,230,270 | A | * | 7/1993 | Bertrand | B23D 45/048 |
| | | | | | 125/14 |
| 5,430,999 | A | * | 7/1995 | Grant | B23D 45/105 |
| | | | | | 56/11.9 |
| 5,486,136 | A | * | 1/1996 | Noda | B23D 45/006 |
| | | | | | 451/347 |

(Continued)

*Primary Examiner* — George Nguyen
(74) *Attorney, Agent, or Firm* — Law Offices of Mark L. Berrier

(57) ABSTRACT

Systems and methods for cutting piles wherein, for example, a pile cutting device is attached to the end of an articulated arm of an excavator, the pile cutting device having a set of grasping arms that hold the pile and a set of saw blades that are linearly advanced to cut the pile in a single stroke. The saw blades are offset so that the cutting paths of the blades overlap. The saw blades may be positioned at the ends of telescoping arms that are coupled to a linearly movable frame. A single hydraulic unit moves the frame along a central rail. The frame is coupled to one or more cables and pulleys so that the travel of the telescopic arms is twice that of the frame.

16 Claims, 2 Drawing Sheets

(56) References Cited

U.S. PATENT DOCUMENTS

| | | | |
|---|---|---|---|
| 5,676,125 A * | 10/1997 | Kelly | B28D 1/045 |
| | | | 125/13.03 |
| 6,863,062 B2 * | 3/2005 | Denys | B23D 45/027 |
| | | | 125/13.01 |
| 8,276,577 B2 | 10/2012 | Wills | |
| 2009/0314149 A1 | 12/2009 | Clark | |
| 2011/0271805 A1 | 11/2011 | Abadie | |

* cited by examiner

# SYSTEMS AND METHODS FOR CUTTING CONCRETE PILES

CROSS-REFERENCE TO RELATED APPLICATIONS

This application claims the benefit of U.S. Provisional Patent Application 62/111,015, filed Feb. 2, 2015 by J. Dustin Butler, which is incorporated by reference as if set forth herein in its entirety.

BACKGROUND

Field of the Invention

The invention relates generally to construction technologies, and more particularly to systems and methods for cutting structures such as concrete piles.

Related Art

The foundations of buildings often include reinforced concrete piles that are driven into the ground. These piles are long vertical columns that transfer the vertical loads of the buildings to a solid footing in the ground (e.g., bedrock). Commonly, each of the piles for a building is driven to refusal (i.e., it is driven into the ground until it cannot be driven any deeper). Because each pile may be driven to a different depth, it may then be necessary to cut each of the piles to a uniform height. The cutting of the piles can be a laborious process, and may hold up subsequent site work, which may be time-critical.

The present systems and methods are intended to provide enhanced safety and reliability, reduce limitations in accessing the piles, and provide an adaptive, modular design that allows rapid deployment and execution of pile cutting operations.

SUMMARY OF THE INVENTION

This disclosure is directed to systems and methods for cutting piles that solve one or more of the problems discussed above. Exemplary embodiments use a pile cutting device that has a body which is attachable to a vehicle such as an excavator. The pile cutting device is attached to the end of an articulable arm of the excavator so that the device can be positioned around a pile. The pile cutting device has a set of grasping arms that hold the pile. After the arms grasp the pile, a set of saw blades are linearly advanced toward the pile, so that each saw blade cuts through about half of the pile in a single stroke. After the pile is cut, the excavator arm can be moved thereby moving the severed upper portion of the pile (which is still grasped by the arms of the pile cutting device).

In one particular embodiment, a pile cutting apparatus comprises a body, a gripper and a cutting unit. The body has a linkage which is capable of connecting the body to a positioning device. The gripper is coupled to the body and is operable to alternately grasp or release a pile. The cutting unit is coupled to the body and is operable to cut the pile while the pile is grasped by the gripper. The cutting unit includes two saw blades that are mounted on a linearly movable frame. The linearly movable frame causes the saw blades to travel in a linear motion from a retracted position (in which the saw blades do not engage the grasped pile) to an extended position (where the saw blades have cut through the pile). The saw blades cut completely through the grasped pile in a single stroke of the saw blades from the retracted position to the extended position.

In one embodiment, the linearly movable frame is a U-shaped frame, where each saw blade is mounted near the end of a different one of two arms that extend forward from a cross member of the U-shaped frame. The saw blades in this embodiment are offset in the same plane so that cutting paths of the saw blades overlap. The cross member of the U-shaped frame may be mounted to a central rail so that the cross member and the U-shaped frame move linearly along the central rail. The U-shaped frame may be coupled to the body by a hydraulic cylinder, wherein the hydraulic cylinder is operable to move the U-shaped frame linearly along the central rail. The saw blades may be mounted on telescoping arms that are coupled to the U-shaped frame, where linear movement of the U-shaped frame causes corresponding linear movement of each of the telescoping arms. The U-shaped frame may be coupled the telescoping arms by cables and pulleys which cause the telescoping arms to move the saw blades by an amount which is twice the travel of the U-shaped frame. In one embodiment, the two saw blades spin in opposite directions.

As noted above, the positioning apparatus to which the pile cutting device is coupled may be a vehicle such as an excavator. The linkage that couples the pile cutting apparatus to the excavator may be configured to manipulate the orientation of the body so that it is aligned with the pile. The linkage may have a standardized configuration that enables connection of the linkage to any one of a variety of different vehicle types. In the case of the excavator, the vehicle has a movable arm, where the linkage couples the body to an end of the movable arm. The movable arm may have an elbow joint and a wrist joint that enable movement of the body with respect to the excavator. The linkage may enable tilting or pivoting of the body with respect to the movable arm and with respect to a pile.

An alternative embodiment comprises a method for cutting a pile. This method includes providing a pile cutting apparatus as described above. The pile cutting apparatus is positioned around a pile with the saws in the retracted position, then the pile is grasped with the gripper. The cutting unit is then linearly extended from the retracted position to an extended position, thereby cutting completely through the pile. The cutting unit is then returned to the retracted position, and the pile cutting apparatus is repositioned to move the severed upper portion of the cut pile, where it can be released.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
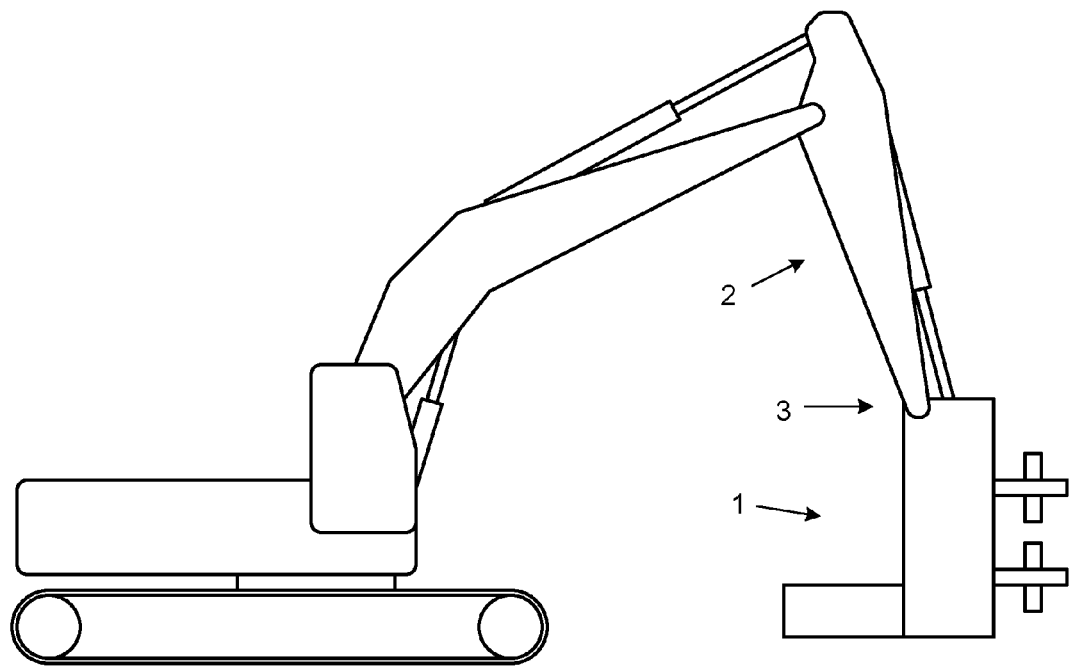
FIG. 1 is a diagram illustrating an excavator with a pile cutting device connected to the end of the articulated excavator arm in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as disclosed herein. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for cutting concrete piles and the like. As record industrial investment and growth continues, especially on the Gulf Coast, there is a service area which is underserved—the area of pile cutting. There are a number of technologies that are available to cut piles, but these technologies are not sufficiently effective or efficient to adequately service the needs in the area.

For instance, one technology utilizes a saw blade which is mountable on a tractor (e.g., an excavator), and is designed to cut reinforced concrete and masonry structures, such as walls, columns, beams and piles (referred to collectively herein as "piles"). The saw device includes a gripper and cutter unit that can be movably attached to an arm or boom of the tractor. The gripper and cutter unit includes a material gripping mechanism such as a set of opposable gripping arms which grip a pile to secure the saw device to the pile and to suspend the portion of the pile which is cut off. The gripper and cutter unit also includes a pivotable saw arm upon which a rotating saw blade is mounted. The saw arm pivots on a shaft so that the saw blade is movable in an arc.

When using this pivoting-arm device, the saw blade cuts one side of a pile, then the pivotable arm is rotated to the other side of the pile so that the saw blade cuts through the rest of the pile from the side opposite the first cut. This device, however, is inefficient and time consuming in that a single saw blade is used to cut through one side of the pile and then the other. Additionally, the pivoting arm on which the saw blade is mounted must have room to swing the blade from one side of the pile to the other, so the device may not be easily used in more confined spaces. Another problem with this technology is that the device is normally mounted on a telescoping boom and has limited freedom of motion at the end of the boom, so it may be difficult to cut piles in some positions or orientations.

The inventor has developed an integrated pile cutting machine that responds to growing industrial demand with an innovative design that delivers reliable, on-demand performance to clients. This machine may provide advantages in comparison to existing methods of cutting piles, including enhanced safety and reliability, decreased limitations on pile access, and an adaptive, modular design that allows rapid deployment and execution of services.

Referring to FIG. 1, one embodiment of the present system is composed of an integrated pile grabbing and cutting mechanism (1) attached to the articulated arm of an excavator (2), with pivoting/tilting systems at the linkage (3), allowing a single operator to cut piles to height from the safety of the excavator cab.

Figure 2:
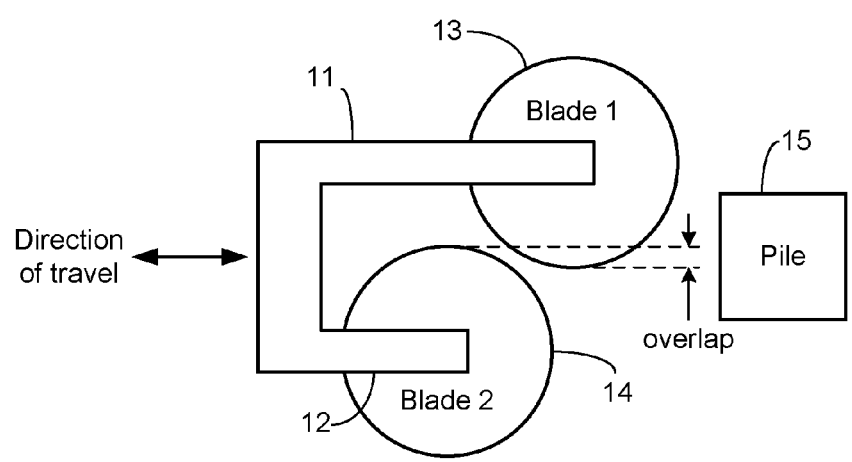
FIG. 2 is a diagram illustrating the positioning of a pair of saw blades on a U-shaped structure in accordance with one embodiment.

The cutting device (1) itself includes twin, offset, parallel blades mounted on telescoping nested arms connected to a U-shaped frame driven by a single hydraulic cylinder. The U-shaped frame and saw blades are illustrated in the diagram of FIG. 2. Two arms (11, 12) extend forward from a cross member (10) of the U-shaped frame (5). The saw blades (13, 14) are mounted near the ends of the arms (11, 12). The frame is moved forward (in the direction of arms 11, 12), causing arms (11, 12) to extend linearly outward to engage the blades (13, 14) with the pile (15). The two blades spin in opposite directions and are offset slightly in the same plane to allow the cutting paths of the saw blades to overlap so that the saw blades together completely cut through the pile.

Referring again to FIG. 1, the articulated excavator arm (2) not only provides reach, structural strength and rigidity, but also carries lines for hydraulic fluid, electricity and cooling water. Such lines can be temporarily mounted to the excavator, consistent with the overall aim of allowing the cutting assembly to be modular, readily detached and relocated on demand.

The pivoting and rotating systems (3) give additional operational flexibility by letting the operator manipulate the orientation of the machine to suit the pile's location and angle relative to the site surface. In this way, the machine can squarely connect with piles that are above or below the ground surface, where the piles are not vertically plumb, and/or where the job requires cuts that are not parallel to the ground. Additionally, the pivots and rotators give more flexibility in how pile ends are safely disposed.

This system provides a mechanical analog to an entire human arm, where the grabbing/cutting first is attached to a fully rotating wrist on an articulated arm with an elbow, allowing pivoting along several distinct but complementary axes of rotation.

The cutting device may alternatively be referred to herein as the Butler Device. The Butler Device is an apparatus that is designed to be mounted on the arm of an excavator or similar vehicle as shown in FIG. 1. The excavator is used to position the Butler Device against a concrete pile so that the device can securely grasp the pile. Then, the device severs the pile below the grasping mechanism. The Butler Device is described below in connection with FIG. 3.

Figure 3:
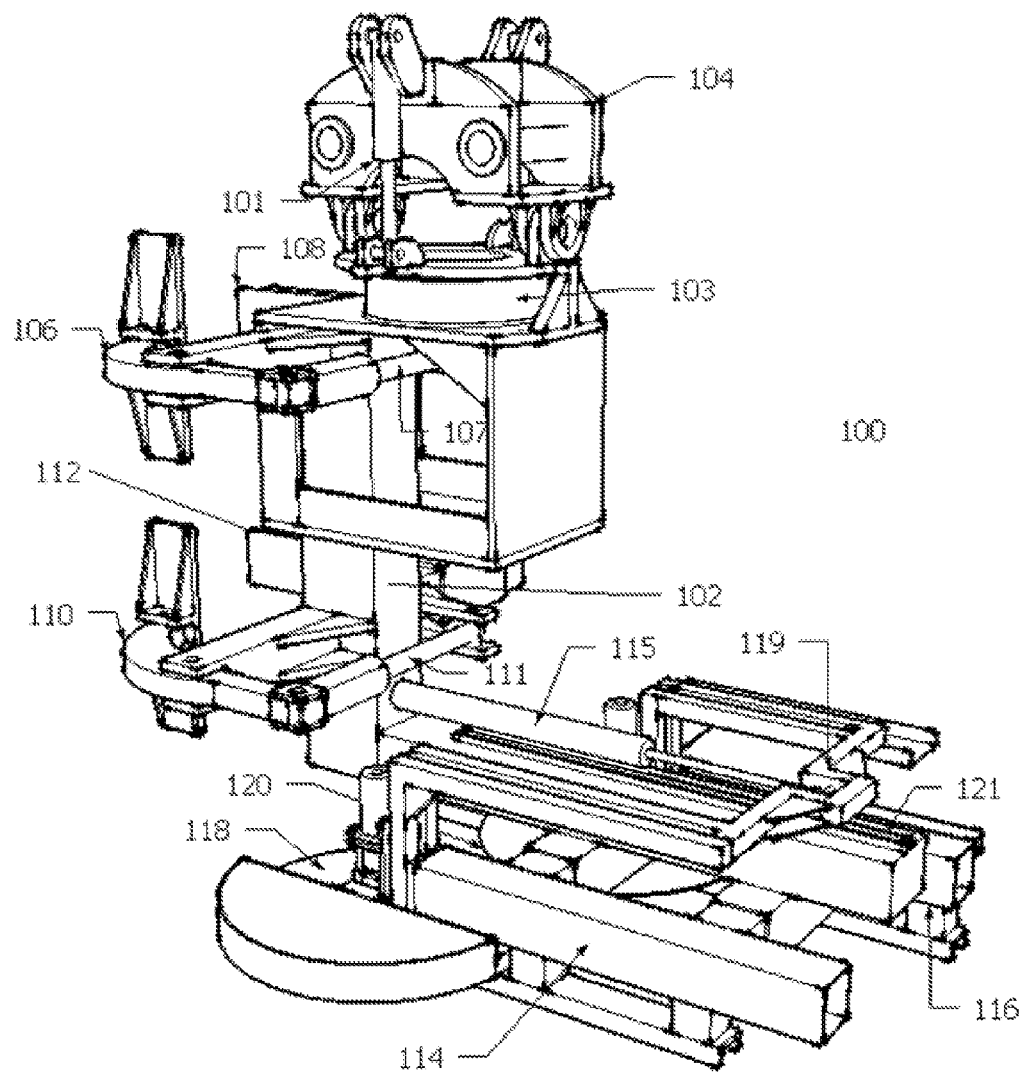
FIG. 3 is a diagram illustrating a pile cutting device in accordance with one embodiment.

Referring to FIG. 3, the Butler Device (100) has a body (102) that is connected to the arm of the excavator by coupling 104. Two sets of grasping arms (106/108 and 110/112) are attached to body 102. Arms 106 and 110 are movable and the pairs of arms can be hydraulically opened (moved apart) or closed (moved together). When the pairs of grasping arms are opened, the Butler Device can be positioned next to the upper portion of a concrete pile, and then the pairs of grasping arms are closed against the pile. Sufficient pressure is applied to the grasping arms to securely hold the upper portion of the pile after it has been severed from the lower end of the pile.

Two linearly moveable telescoping arms (114, 116) are coupled to body 102. A circular saw blade (118, 120) is mounted on each of telescoping arms 114 and 116. Telescoping arms 114 and 116 are retracted (moved away from grasping arms (106/108 and 110/112) while the Butler Device is being positioned to grasp the pile. After the pile is secured between the grasping arms, telescoping arms 114 and 116 are moved forward, toward the pile so that saws 118 and 120 cut through the pile. After the pile has been severed, telescoping arms 114 and 116 are retracted, away from the pile. This action is described in more detail below. After the pile has been severed, the Butler Device can be used to move the severed upper section of the pile to a desired location and released. This process can then be repeated with subsequent piles.

Figure 4:
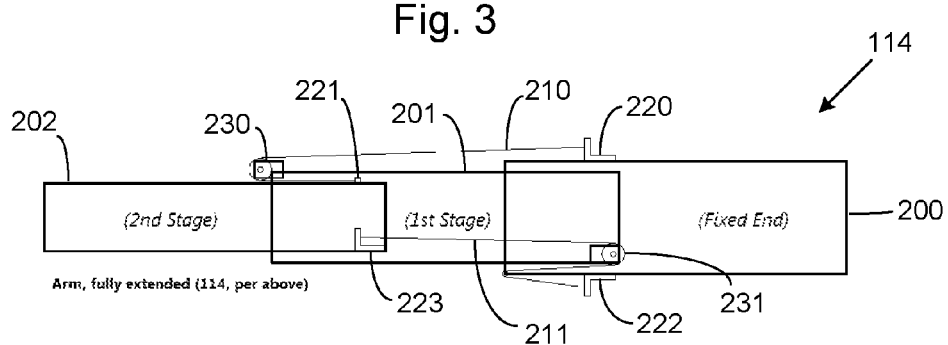
FIG. 4 is a diagram illustrating the structure of telescoping arms as used in one embodiment.

The blades are delivered to the pile by the actuation of a single hydraulic cylinder (115) which retracts to pull a rigid U-shaped structure (119) towards the body (102) of the Butler Device. This action does two things. As shown in FIG. 4, it first directly extends (pushes out) the first telescoping stage (201) from the fixed stage (200) of the nested telescoping arms (114, 116). Simultaneously, this extends (pulls out) the second stage (202) through the use of an internal cable (210), which is attached to fixed points 220 and 221 on the fixed stage (200) and second telescoping stage (202), respectively. Cable 210 extends around pulley 230, which is fixed to a distal end of the first telescoping stage (201), so that when the first telescoping stage is extended from the fixed stage (200), cable 210 pulls the second telescoping stage (202) out of the first telescoping stage (201).

A similar mechanism is used to retract the nested telescoping arms (114, 116) and move the blades away from the pile. When the hydraulic cylinder (115) is extended, U-shaped structure (119) is moved away from the body (102) of the device. As shown in FIG. 4, this directly pushes the first telescoping stage (201) back into the fixed stage (200) of the nested telescoping arms (114, 116). Simultaneously, the second stage (202) is pulled into the first telescoping stage (201) through the use of an internal cable (211), which is attached to fixed points 222 and 223 on the fixed stage (200) and second telescoping stage (202), respectively. Cable 211 extends around pulley 231, which is fixed to the proximal end of the first telescoping stage (201), so that when the first telescoping stage is pulled into the fixed stage (200), cable 210 pulls the second telescoping stage (202) into of the first telescoping stage (201).

The cable and pulley mechanisms within the telescoping arms (as pictured in FIG. 4), leverages the 'stroke' of the cylinder (115) by a factor of two. The integrated actuation of both stages is beneficial in many ways. For example, the full extension of the arms is faster because both stages extend simultaneously. Additionally, the design is more compact, lighter, less complicated (with fewer independently moving parts) than conventional designs. This mechanism is more efficient, and has reduced potential for component failure. It should be noted that the term "cable should be construed to include cables, chains or similar components.

The rigid U-shaped structure (119) also provides several advantages over conventional designs. For instance, it evenly distributes the force of the cylinder (115) between the two arms (114, 116) so that the blades (118, 120) advance towards the pile with uniform speed. The structure also maintains the positions of the saw blades with respect to each other. The U-shaped structure travels linearly on a rail system (121) that is centrally positioned. As compared to designs that advance the saw blades on separate rails, this mitigates the potential for the frame to torque or twist when a single blade is engaged with the pile, thereby causing the mechanism to bind. The present mechanism also ensures that the arms are not deflected either vertically or horizontally perpendicular to the linear axis of arm movement. In short, the U-shaped structure ensures that the single cylinder (115) extends and retracts both arms and blades in a uniform, efficient and secure manner.

The Butler Device is substantially different in form and operation from other designs currently in use for pile cutting in various other ways as well. For example, in regard to the delivery arm, one prior art design uses a type of pile gripping/cutting head which is attached to a straight boom that is extended outward from the base on a Gradall machine. The cutter head's positioning is therefore essentially limited to a linear line-of-sight delivery, extending straight from the base of the Gradall machine. The present design positions the gripping/cutting head at the end of an articulated excavator arm, such that there is an elbow which permits delivery of cutting operations at oblique and acute angles. This articulation, combined with the greater wrist flexibility provided by rotators and pivots, allows the cutter head to operate within well-type excavations, and allowing near, deep cuts in places where there isn't a graded descent to accommodate a linear boom as used in the prior art system.

In regard to the saw mechanisms, one prior art system, as described above, uses a single-blade system on a pivotable arm that rotates in an arc relative to the frame. This design requires arm relocation and multiple cut movements for a single pile. The present machine contains two blades, that are offset, parallel and spinning in opposing directions. These saw blades are mounted on telescoping nested arms connected to a U-shaped frame driven by a single hydraulic cylinder to move the blade arms moving linearly relative to the frame.

In regard to the brand-independent interoperability of components, the prior art system described above is designed for operability with a specific brand of equipment (Gradall). The pin connection points for such machines are believed to be unique to that brand, so the device cannot be used with other equipment. The present machine utilizes standard connection points that are common across different types and brands of excavators. As a result, the machine is interoperable across excavator brands. Combined with the general modularity of the design, this allows for greater flexibility, enabling the machine to be readily mounted on virtually any excavator of appropriate size.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to a particular embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within this disclosure.

What is claimed is:
1. A pile cutting apparatus comprising:
a body having a linkage which is capable of connecting the body to a positioning device;
a gripper coupled to the body, wherein the gripper is operable to alternately grasp or release a pile;

a cutting unit coupled to the body, wherein the cutting unit is operable to cut the pile while the pile is grasped by the gripper;
wherein the cutting unit includes two saw blades that are mounted on a linearly movable frame;
wherein the linearly movable frame is movable to cause the saw blades to travel in a linear motion from a retracted position in which the saw blades do not engage the grasped pile to an extended position;
wherein the saw blades cut completely through the grasped pile in a single stroke of the saw blades from the retracted position to the extended position.

2. The pile cutting apparatus of claim 1, wherein the linearly movable frame comprises a U-shaped frame, wherein each saw blade is mounted near the end of a different one of two arms that extend forward from a cross member of the U-shaped frame.

3. The pile cutting apparatus of claim 2, wherein the saw blades are offset in the same plane so that cutting paths of the saw blades overlap.

4. The pile cutting apparatus of claim 2, wherein the cross member of the U-shaped frame is mounted to a central rail and wherein the cross member and the U-shaped frame move linearly along the central rail.

5. The pile cutting apparatus of claim 4, wherein the U-shaped frame is coupled to the body by a hydraulic cylinder, wherein the hydraulic cylinder is operable to move the U-shaped frame linearly along the central rail.

6. The pile cutting apparatus of claim 5, wherein each of the saw blades is mounted on a corresponding telescoping arm, wherein the U-shaped frame is coupled to each of the telescoping arms, wherein linear movement of the U-shaped frame causes corresponding linear movement of each of the telescoping arms.

7. The pile cutting apparatus of claim 6, wherein the U-shaped frame is coupled the telescoping arms by one or more cables and pulleys, wherein the cables and pulleys cause the telescoping arms to move the saw blades by an amount which is twice the travel of the U-shaped frame.

8. The pile cutting apparatus of claim 1, wherein the linkage is configured to manipulate an orientation of the body, whereby the orientation of the body is aligned with the pile.

9. The pile cutting apparatus of claim 1, wherein the linkage has a standardized configuration that enables connection of the linkage to any one of a plurality of different vehicle types.

10. The pile cutting apparatus of claim 1, wherein the two saw blades spin in opposite directions.

11. The pile cutting apparatus of claim 1, further comprising the positioning device, wherein the positioning device comprises a vehicle, and wherein the linkage connects the body to the vehicle.

12. The pile cutting apparatus of claim 11, wherein the vehicle has a movable arm, wherein the linkage couples the body to an end of the movable arm.

13. The pile cutting apparatus of claim 12, wherein the vehicle comprises an excavator, and wherein the movable arm of the excavator has an elbow joint and a wrist joint that enable movement of the body with respect to the excavator.

14. The pile cutting apparatus of claim 13, wherein the linkage enables tilting or pivoting of the body with respect to a pile.

15. The pile cutting apparatus of claim 1, wherein the gripper comprises one or more sets of arms, wherein each set of arms is configured to be alternately closed to grasp the pile or opened to release the pile.

16. A method of cutting a pile, the method comprising:
providing a pile cutting apparatus including
a body having a linkage which is capable of connecting the body to a positioning device;
a gripper coupled to the body, wherein the gripper is operable to alternately grasp or release a pile, and
a cutting unit coupled to the body, wherein the cutting unit is operable to cut the pile while the pile is grasped by the gripper,
wherein the cutting unit includes two saw blades that are mounted on a linearly movable frame, wherein the linearly movable frame is movable to cause the saw blades to travel in a linear motion from a retracted position in which the saw blades do not engage the grasped pile to an extended position, and wherein the saw blades cut completely through the grasped pile in a single stroke of the saw blades from the retracted position to the extended position;
positioning the pile cutting apparatus around a pile with the saws in the retracted position;
grasping the pile with the pile cutting apparatus;
linearly extending the cutting unit from the retracted position to an extended position and thereby cutting completely through the pile;
returning the cutting unit to the retracted position;
repositioning the pile cutting apparatus and thereby moving an upper portion of the cut pile away from a lower portion of the cut pile; and
releasing the upper portion of the cut pile.

* * * * *